Figure 1:
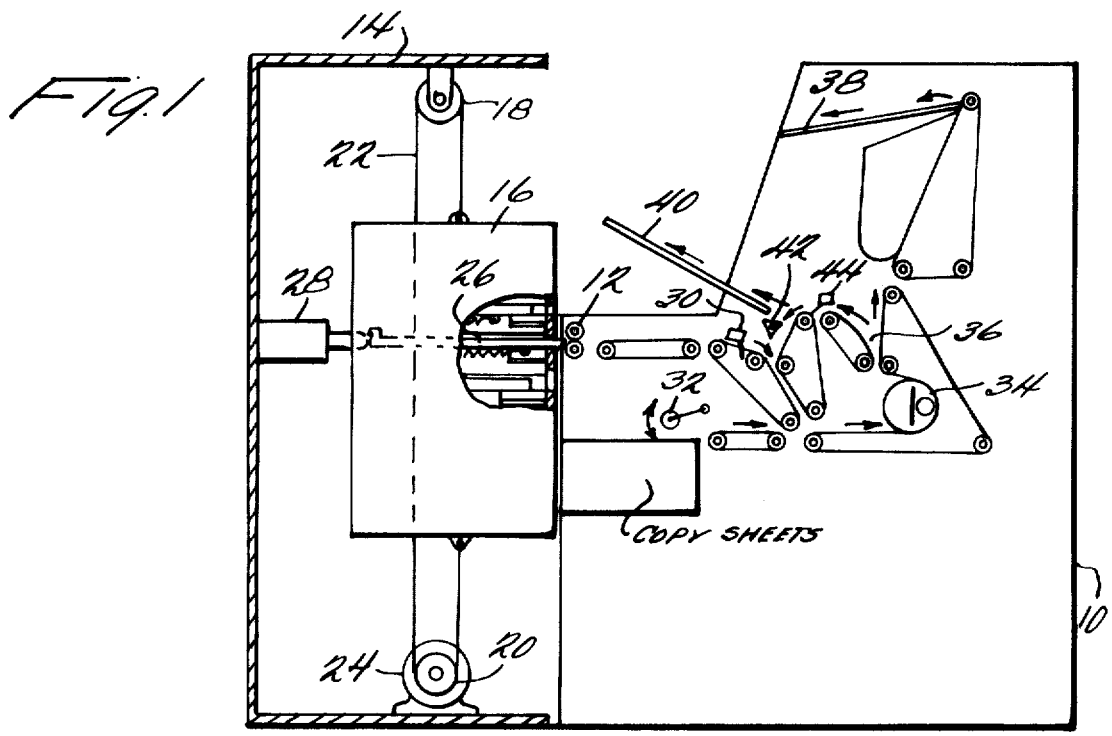

United States Patent
Umahashi

[15] 3,659,837
[45] May 2, 1972

[54] AUTOMATIC ORIGINAL FORM FEEDING DEVICE FOR THE USE OF A COPYING MACHINE

[72] Inventor: Minoru Umahashi, Higashi, Japan
[73] Assignee: Kabushiki Kaisha Ricoh, Tokyo, Japan
[22] Filed: May 7, 1970
[21] Appl. No.: 35,539

Related U.S. Application Data

[63] Continuation-in-part of Ser. No. 720,286, Apr. 10, 1968, abandoned.

[52] U.S. Cl. .................................. 271/9, 221/81, 271/61
[51] Int. Cl. ................................................. B65h 1/08
[58] Field of Search .............. 271/9, 62 R, 61; 221/79, 81, 221/88; 353/103

[56] References Cited

UNITED STATES PATENTS

| | | |
|---|---|---|
| 1,021,723 | 3/1912 | Morse ........................... 221/81 |
| 2,929,296 | 3/1960 | Kreminsky .................... 353/103 X |
| 3,067,885 | 12/1962 | Kohler ........................... 271/62 X |
| 3,165,230 | 1/1965 | Hahn .............................. 221/88 X |

Primary Examiner—Joseph Wegbreit
Assistant Examiner—Bruce H. Stoner, Jr.
Attorney—Burgess, Ryan and Wayne

[57] ABSTRACT

A device for automatically and successively feeding original forms of varying sizes and thicknesses to a copying machine. Each original form is individually supported by one of a plurality of vertically spaced, horizontally reciprocable tables which are housed in a vertically movable cabinet to permit automatic and successive feeding of each individual original form to a copying machine.

2 Claims, 5 Drawing Figures

Patented May 2, 1972

3,659,837

4 Sheets-Sheet 1

INVENTOR
MINORU UMAHASHI

BY
Burgess, Ryan & Hicks
ATTORNEYS

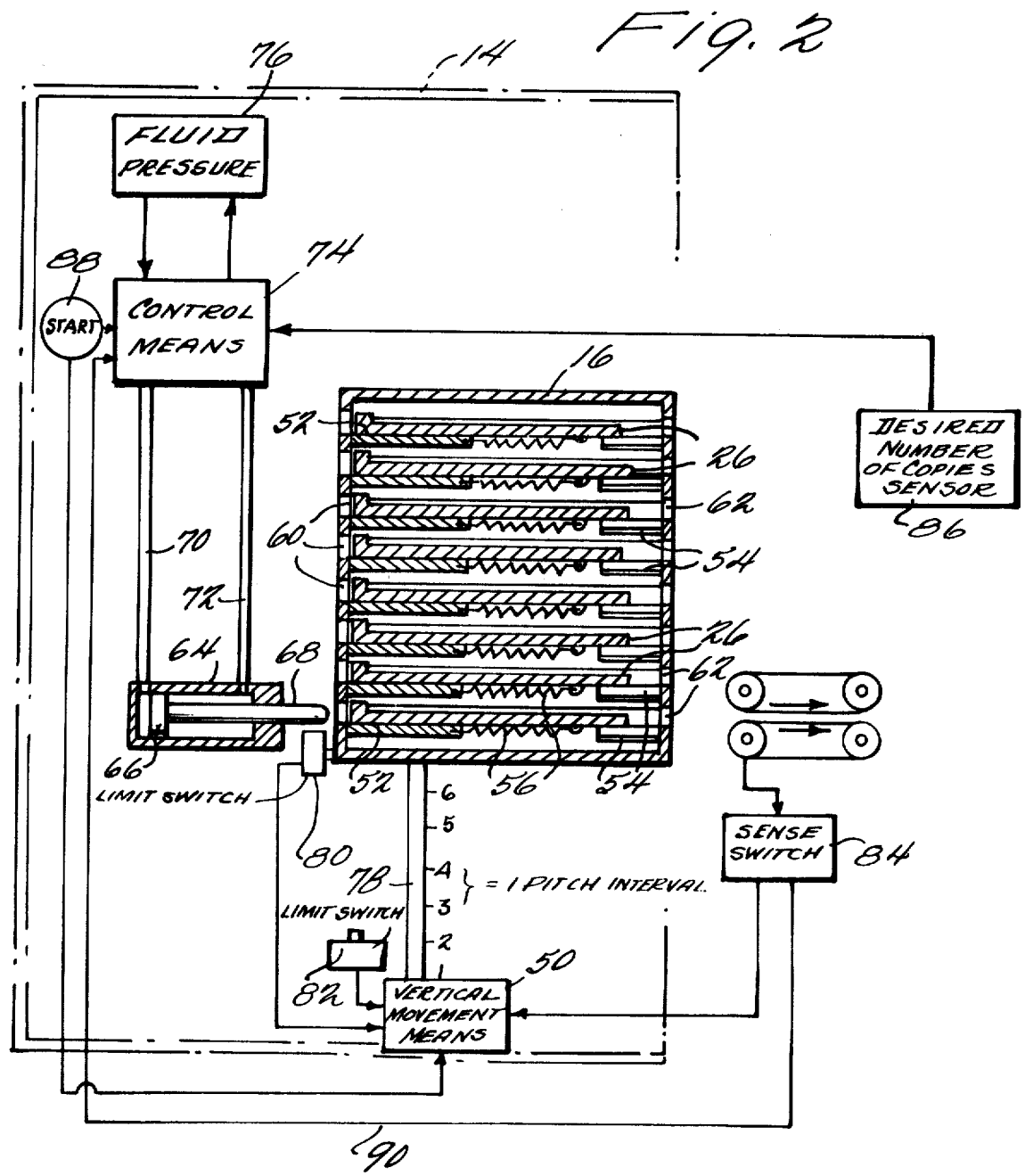

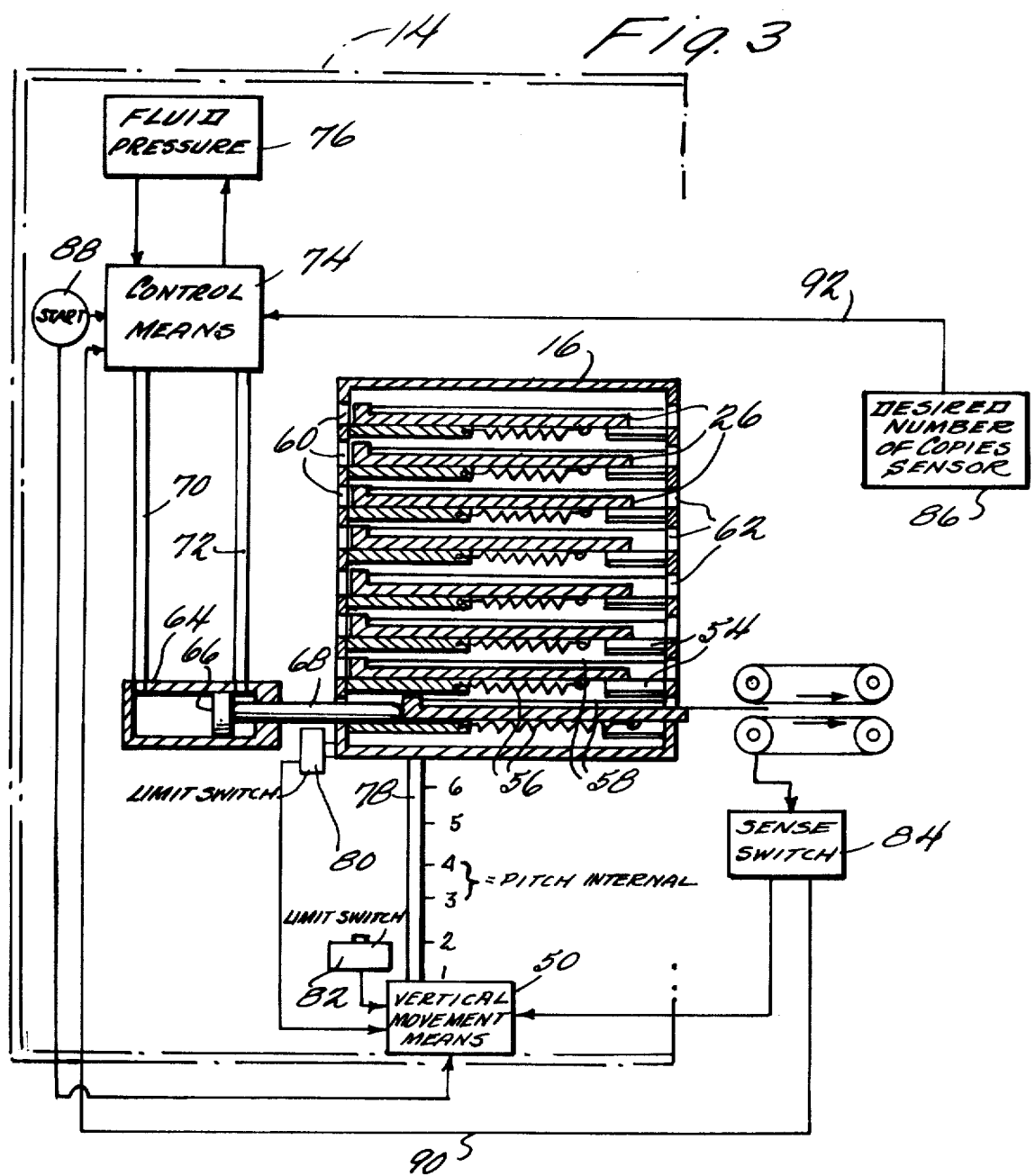

Patented May 2, 1972

3,659,837

4 Sheets-Sheet 4

INVENTOR
MINORU UMAHASHI

BY
Burgess, Ryan & Hicks
ATTORNEYS

AUTOMATIC ORIGINAL FORM FEEDING DEVICE FOR THE USE OF A COPYING MACHINE

This application is a continuation-in-part of my previous application Ser. No. 720,286 filed April 10, 1968 and now abandoned.

The invention disclosed herein relates to an automatic original form feeding device for use with a copying machine which is designed to make one or more copies of an original form. A device constructed according to the teaching of this invention results in feeding original forms automatically and successively to the input of such a copying machine where one or more copies of each such original form are produced before the next original form is automatically fed into the machine.

Prior to this invention, the known devices for automatically and successively feeding such original forms encountered many practical difficulties in operation and were thus something short of being a complete success. Normally, the original forms to be copied are only available in differing sizes and thicknesses as well as different coefficients of friction. Even taking only these differences into account, it is apparent that an automatic original form feeding device will not be entirely satisfactory unless it is capable of handling any mixture of such differing original forms which may be presented as a single bundle of documents to be copied.

Furthermore, the leading edges of the original forms are likely either to already be in a damaged condition or to become damaged after several copying operations and therefore become unusable in prior feeding devices which are incapable of handling such damaged documents.

The basic principle heretofore used for feeding original forms has been to stack original forms in a pile with the leading edges aligned and then to provide a device that attempts to slip one sheet at a time off this aligned pile and thus effect individual automatic feeding to the copying machine. However, with the leading edges in such close relationship, the known devices often fail to reliably effect individual automatic feeding.

Due to these factors, the prior known machines have tended to be faulty in accidentally feeding two original forms simultaneously or in failing to feed any original form when required. Such faults often occur even when the original forms are of similar dimensions, etc., but are greatly accentuated when a bundle of documents having vastly differing physical characteristics is presented for automatic feeding to a copying machine.

When these feeding problems occur with copy sheets as opposed to original forms, the loss can be limited to one sheet per occurrence and an inaccurate final number of copies. However, in the case of original forms, the loss will grow to equal the number of accidents multiplied by the number of copying cycles for each accident plus an even greater inaccuracy in the number of final copies.

These difficulties have constituted serious deficiencies in the known automatic feeders and attempts have been made to limit such problems by providing original forms with special leading edges or by applying a special process to the original form itself prior to the feeding operation. However, these prior attempts to solve the problems have been time consuming, costly and not necessarily applicable to all kinds of original forms since the different types of original forms commonly used for reproduction are almost limitless.

Therefore, it is an object of this invention to eliminate the aforementioned disadvantages and to provide a practicable automatic feeding device which may be used with any type of original forms.

It is another object of this invention to provide a device wherein each of the leading edges of a plurality of original forms is held separately or in a spaced-apart relationship from all other leading edges thereby greatly facilitating extremely reliable automatic feeding of successive ones of the original forms.

Yet another object of this invention is to provide an automatic control means for coordinating feeding movements of original forms with the copying operations of the copying machine in a device where the leading edges of all the original forms are maintained in a spaced-apart relationship.

Figure 5:
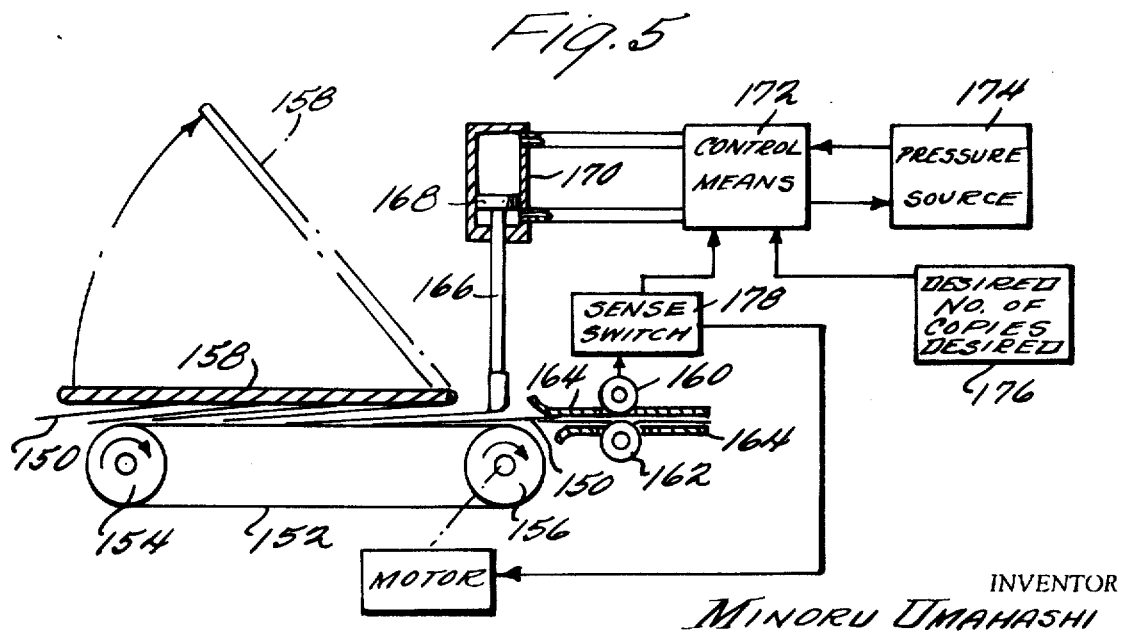
Figure 4:
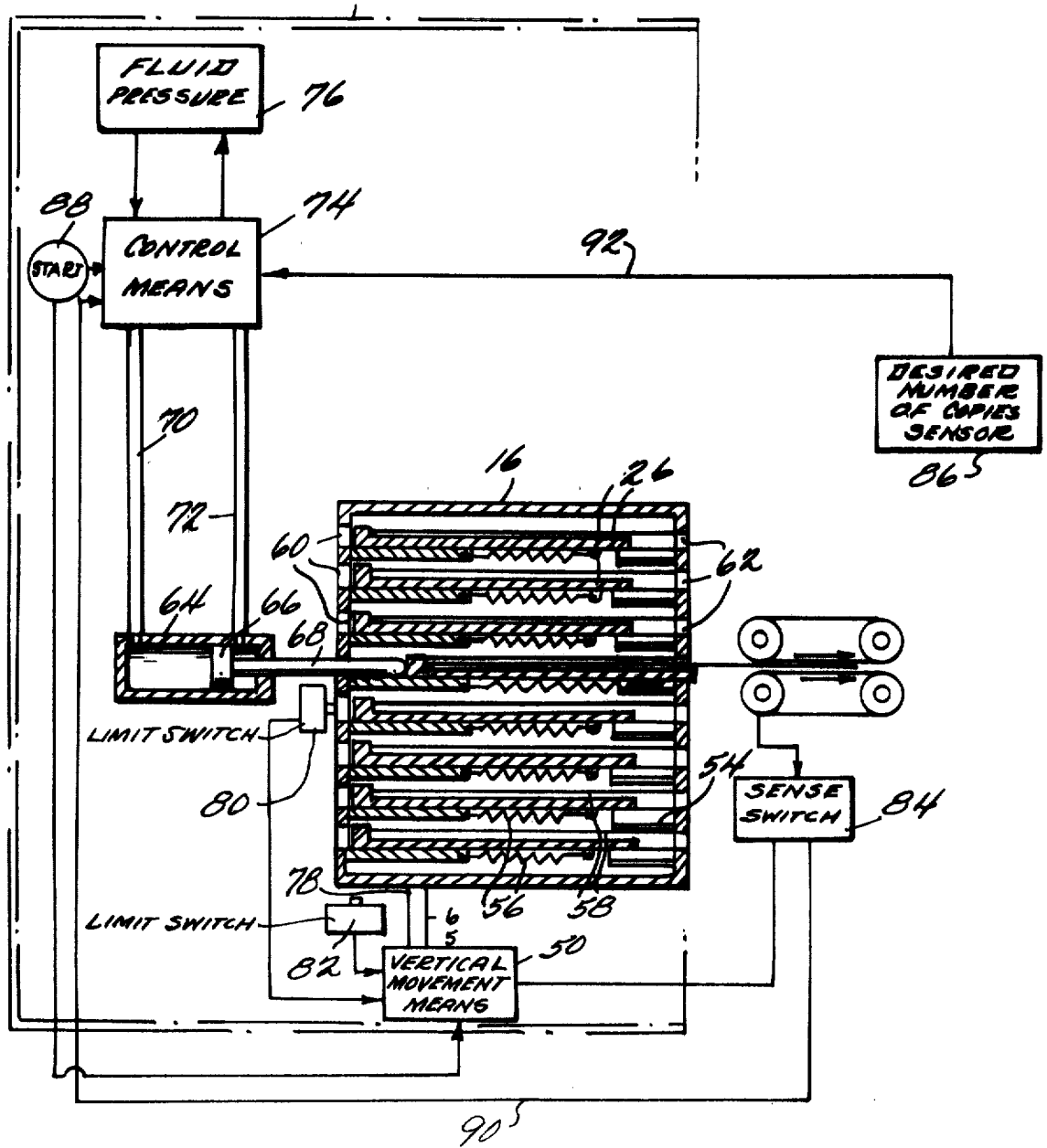

A fuller and more complete understanding of this invention may be obtained by careful study of the following detailed description in combination with the drawings, of which:

FIG. 1 is an overall side view of an illustrative embodiment of this invention shown in position for use with a copying machine, FIG. 2 is a cross section of the illustrative FIG. 1 embodiment of this invention shown at an initial position in a first automatic feeding cycle together with schematic depictions of suitable control means for use therewith, FIG. 3 is another view similar to that of FIG. 2 but shown at a later position in a first automatic feeding cycle, FIG. 4 is yet another view similar to that of FIG. 2 but shown at a point in a subsequent automatic feeding cycle, and FIG. 5 is a cross section of another illustrative embodiment of this invention.

This invention is based on the realization that the aforesaid feeding problems cannot be overcome using the known principles wherein the leading edges of a plurality of original forms are aligned. Accordingly, an illustrative embodiment is shown in FIG. 1 wherein provisions are made for automatically and successively feeding original forms with the leading edge of each original form being maintained separated or spaced apart from the leading edges of other original forms. The copying machine 10 is of conventional construction and is provided with an input conveyor belt mechanism 12. As will be well known by those in the art, the machine 10 may be constructed according to known principles such that whenever an original form is fed between the conveyor belt 12, the machine will produce any desired number of copies therefrom (the desired number is usually manually inserted by turning a knob or other control) and then be in condition for receiving a subsequent original form at conveyor 12 to repeat the process. This invention is directed to a device for automatically feeding such original forms to conveyor 12.

An outer casing 14 is provided for the automatic form feeding device of this illustrative embodiment. Within this outer casing, a movable cabinet 16 is mounted for vertical movement within the casing. The cabinet 16 may be constrained to the desired vertical movement by any conventional guiding means such as the pulleys 18 and 20 in combination with rope or belt 22. In the embodiment shown in FIG. 1, the cabinet 16 may be moved up or down through any desired distance by motor 24 driving belt 22 which, in turn, is connected to cabinet 16 over pulleys 18 and 20.

Within cabinet 16 there are a plurality of equally spaced original form carrying tables 26 which are slidably mounted for horizontal movement. As will be more fully explained below, each table is spring biased to the left side of the cabinet in FIG. 1 and selectively moved to the right by piston and cylinder means 28 which is controlled as pointed out below. If each table carries one original form and the vertical movements of cabinet 16 are properly coordinated with the movements of actuator 28, it will be seen that individual original forms on tables 26 may be automatically and cyclically fed into copying machine 10 at input 12.

The copying machine 10 may be of any conventional and well known construction. For instance, in FIG. 1 a typical copying machine is schematically illustrated. When an original form is fed in at conveyor 12, it subsequently passes microswitch 30 which orders copy sheet feeder 32 to feed a blank copy sheet which becomes superimposed on the original form and fed into an exposure unit at 34. After separation at 36, the exposed copy sheet will be developed and fed out of the machine at 38 while the original form will either be conveyed out of the machine at 40 or again superimposed with another copy sheet depending upon the position of guide member 42 activated by microswitch 44 which has been preset to a desired number of copies. It will be readily understood by one skilled in the art that many known copying machines operate in this or a substantially similar manner.

The subject matter of this invention is shown in greater detail in FIG. 2. Here the outer casing 14 encloses cabinet 16 which is designed to make intermittent vertical movements corresponding to the distance between tables 26 or to what may be referred to as "one pitch interval" for convenience. These vertical movements may be brought about by any convenient means such as the motor, belt and pulleys of FIG. 1 or by the use of conventional racks and pinions or ratchet wheels. Whatever means which may be employed in any given embodiment are illustrated schematically as element 50 in FIG. 2.

Each of the tables 26 is mounted on sliding platforms 52 and 54 which are fixed to the movable cabinet 16. Between the platforms 52 and the lower portion of each table 26 extends a contractable spring 56 which is effective to bias each slidable table 26 to the left in FIG. 2. The platform 54 preferably includes a slot to permit movement of the spring 56 and any connecting extension of tables 26 to move freely therethrough when the table 26 carrying an original form 58 is moved to the right. Openings 60 and 62 are respectively provided on the front and rear surfaces of cabinet 26 for movement of thrusting lever 68 and for the feeding original forms to conveyor 12 respectively.

At a suitable position (generally opposite input conveyor 12), an operating or actuating cylinder 64 and piston 66 is provided. The piston 66 is also attached to the thrusting lever 68 which is adapted to push the table 26 to the right towards input conveyor 12 and thus result in feeding original form 58 to copying machine 10. Control conduits 70 and 72 are connected to control means 74 which in turn communicates with a fluid reservoir and source of fluid pressure 76. Through control means 74 and conduits 70 and 72, a pressure liquid may be guided into and out of operating cylinder 64 on either the left or the right side of piston 66 thus causing the thrusting lever 68 to move to the right or to the left respectively.

The cabinet 16 is designed to make intermittent vertical movements of one pitch interval as is shown schematically in FIG. 2. Vertical movement means 50 is attached to cabinet 16 by a shaft 78 having a few pitch interval markings thereon to aid in illustrating the operation of the invention. Limit switch or sensor 80 detects one extreme position of cabinet 16 while switch or sensor 82 senses the opposite extreme position. Sensor 84 detects the entry of an original form into machine 10 (analogous to switch 30 in FIG. 1) while sensor 86 senses the completion of a desired number of copies completed by copy machine 10 (analogous to switch 44 in FIG. 1). The outputs from these various switches or sensors are fed to the vertical movement means 50 and/or to control means 74 to effect an automatic cycle of operation as described below.

In FIG. 2, the movable cabinet 16 is shown in its original position at the top of casing 14 with the lowest rack or table 26 substantially aligned with thrusting lever 68 and input conveyor 12. In this position, original forms 58 are manually inserted into openings provided in the side surface of the cabinet 16 onto each of tables 26. Then, by pressing start button 88, pressurized liquid is caused to flow into the left side of cylinder 64 thus forcing piston 66 and thrusting lever 68 to the right. In this manner the lowest table 26 is caused to move to the right and to carry with it original form 58 for feeding into conveyor 12 as shown in FIG. 3.

As the leading edge of the original form 58 is grasped by conveyor 12 and fed into machine 10, sense switch 84 detects the feeding and sends a signal on line 90 to control means 74 which causes the pressurized liquid to be switched from the left to the right hand side of piston 66 thus causing the thrusting lever 68 to move back to the left and return to its original position as shown in FIG. 2. Since the tables 26 are spring biased to the left, the lowermost table 26 also returns to its original position as the remainder of this first original form is fed into copy machine 10. After a time sufficient to permit completion of the feeding process (which may be sensed by sensor 84 as the trailing edge of the original form passes), the vertical movement means 50 responds by lowering cabinet 16 by one pitch interval corresponding to the space between two adjacent racks 26 thereby causing the second rack from the bottom to be aligned with thrusting lever 68 and conveyor 12. When the copy machine 12 finishes making the desired number of copies, sensor 86 signals control means 74 via line 92 causing control pressure liquid to flow into cylinder 64 on the left side of piston 66 to cause another feeding operation cycle to take place.

This process then repeats itself until finally the original form on the topmost rack 26 has been fed into the machine 10. For instance, FIG. 4 illustrates the fifth rack from the bottom being pushed forward into a feeding position.

After the original form on the topmost rack has been fed into the copying machine, and the thrusting lever has been returned to the leftmost position, this position of the cabinet 16 may be sensed by sensor 82 which causes vertical movement means 50 to reverse and raise the cabinet until sensor 80 senses movement to the original position shown in FIG. 2. In addition, the cabinet may be restored to its starting position by pressing start button 88.

It will be readily appreciated by one skilled in the art that control means 74 and vertical movement means 50 may be constructed according to well known methods using standard readily available electrical, mechanical and/or electromechanical devices. Further, it should be apparent that cylinder 64 and piston 66 may be easily replaced by a solenoid or other well known movement means. There are a great variety of known methods for interconnecting electrical relays, switches, sensors, valves, cams, pulleys, wheels, etc. to achieve the desired cyclic functions as set forth above and since these details may be readily supplied by one skilled in the art, they will not be further discussed.

Referring now to FIG. 5, another illustrative embodiment of this invention is shown. Here original forms 150 are placed on endless belt 152 between rollers 154 and 156 with the leading edge of each original form slightly slipped back or spaced apart from the leading edges of adjacent forms. A rotatable pressure plate 158 is lifted up to the position shown in broken lines when placing original forms on belt 152. Rollers 160 and 162 correspond to the input conveyor 12 of a copy machine as shown in FIG. 1 which is adapted to grasp the leading edge of an original form for feeding into the copying machine. Guide plates 164 are provided for ensuring that the original forms pass between rollers 160 and 162. A vertically movable stopper piece 166 is positioned over belt 152 in front of the rollers 160 and 162 and guide plates 164. The vertical movement of this stopper piece is controlled by piston 168 and cylinder 170 in combination with control means 172 and fluid reservoir 174 in much the same fashion as the thrusting lever was controlled in the embodiment of FIGS. 2–4. Control means 172 also has control inputs from sensor 176 (sensing when a desired number of copies have been completed) and sensor 178 which senses the presence and absence of an original form between rollers 160 and 162. Motor 180 is adapted to cause movement of belt 152.

In operation, belt 152 is moved (with stopper 166 raised) until the first of a plurality of original forms (previously loaded on belt 152 when pressure plate 158 was in the "up" position) is sensed as being between rollers 160 and 162. At this point belt 152 is stopped and stopper piece 166 is caused to descend and engage the leading edge of the following original form thus preventing it from being carried with the first form by virtue of surface friction therebetween. Upon completion of the necessary copying operation (when the desired number of copies have been made), stopper piece 166 is raised and belt 152 is again moved to feed the next original form to the input rollers 160 and 162. Thus a plurality of original forms are individually and automatically fed into a copying machine by the embodiment of FIG. 5.

In both of the disclosed illustrative embodiments, the leading edges of the original forms are held separately or in a spaced-apart relationship to ensure accurate single sheet feeding of original forms. Furthermore, automatic feeding devices constructed according to this invention permit the combined use of practically any kind of original form irrespective of differences in types, thicknesses or other physical form features.

Many modifications of the illustrative embodiments of feeding devices for maintaining leading edges separated during feeding operations will be apparent to those skilled in the art and are therefore considered to be within the scope of this invention.

What is claimed is:

1. A device for automatically feeding individual original forms to receiving means in a copying machine comprising a housing mounted alongside said receiving means and arranged for vertical movement in increments;

a plurality of table means fixed to said housing and including a plurality of tables respectively positioned thereon in sliding contact, said table means being vertically spaced within said housing and said tables arranged to have an individual original form placed on each;

delivery means including a reciprocatory lever positioned on the side of said housing opposite to the side where the receiving means is positioned, said delivery means located at the same horizontal level as said receiving means;

a plurality of springs corresponding in number to said table means and individually attached thereto;

each said spring having one end attached to a bottom surface of an individual table, and the other end of said spring is fixed to said housing to provide a bias for said table toward said delivery means; and sensing means for automatically initiating incremental vertical movement of said housing to successively align each table means with said lever which reciprocates to slide an individual table toward said receiving means to deliver an individual form thereto, and said spring acting to retract said table toward said delivery means after delivery of said form.

2. A device according to claim 1 in which each said table means includes a first platform element supporting part of an individual table and fixed to said housing on the side adjacent to said delivery means, said one end of said spring attached to said fixed first element, and each said table means includes a second platform element supporting another part of an individual table and fixed to said housing on the side adjacent to said receiving means, said second platform element including a slot for said one end of said spring to pass therethrough upon reciprocating movement of said lever sliding said table toward said receiving means, said platform elements being longitudinally spaced with respect to each other to receive the individual table in sliding contact.

* * * * *